Feb. 23, 1937.  E. E. HEWITT  2,071,754
DOOR AND BRAKE INTERLOCK DEVICE
Filed Nov. 16, 1933
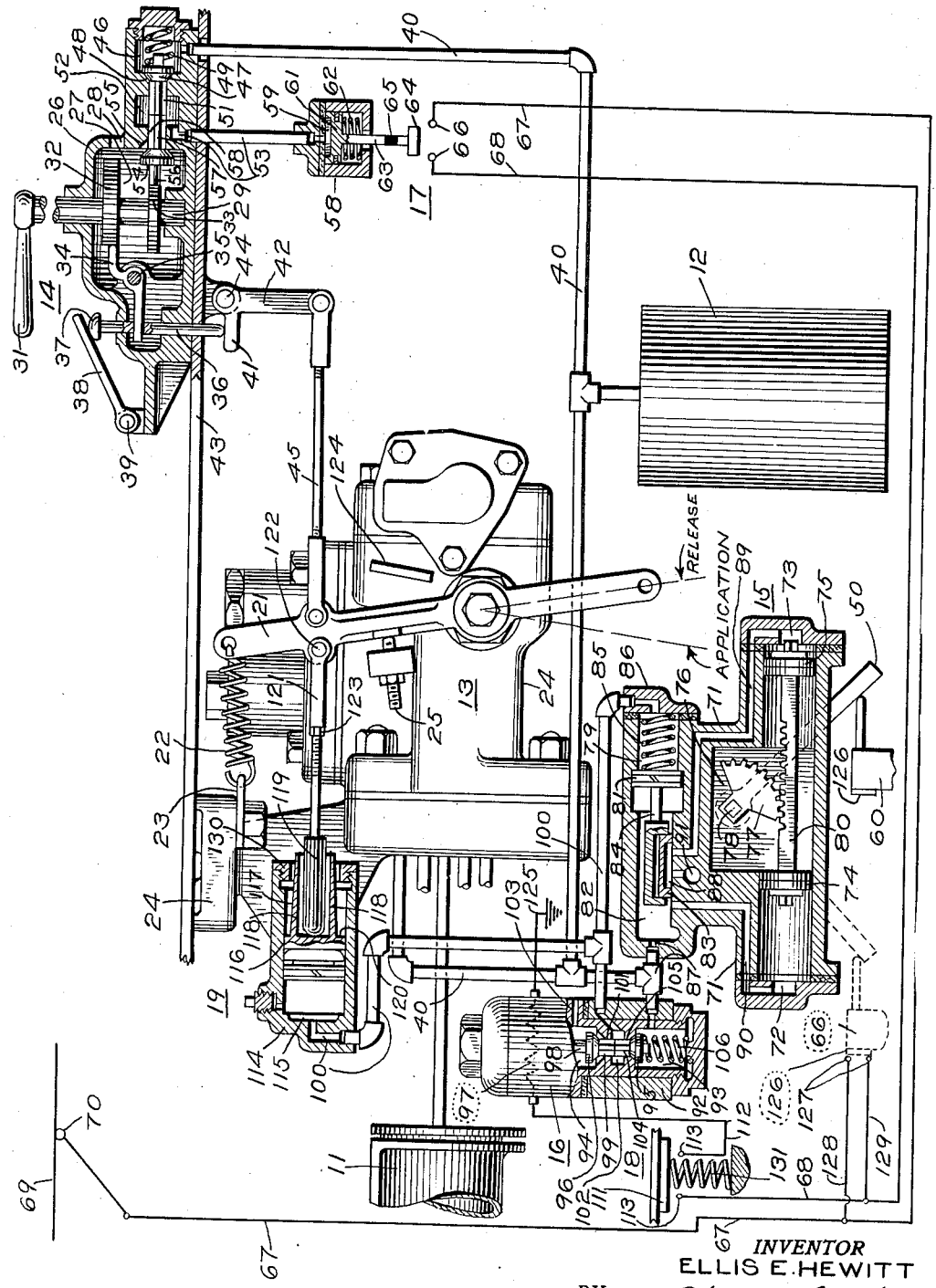
INVENTOR
ELLIS E. HEWITT
BY
Wm. M. Cady
ATTORNEY Patented Feb. 23, 1937

2,071,754

UNITED STATES PATENT OFFICE 2,071,754

DOOR AND BRAKE INTERLOCK DEVICE

Ellis E. Hewitt, Edgewood, Pa., assignor to The Westinghouse Air Brake Company, Wilmerding, Pa., a corporation of Pennsylvania Application November 16, 1933, Serial No. 698,231

22 Claims. (Cl. 303—6.1)

This invention relates to control apparatus for fluid pressure actuated equipment and particularly to control apparatus for controlling the fluid pressure actuated brakes, door engine and appurtenant devices of motor driven passenger vehicles such as transit coaches and motor coaches.

In the copending application of David W. Lloyd, Serial No. 698,242, filed November 16, 1933, assigned to the assignee of this application, control apparatus for a passenger vehicle is disclosed, wherein an improved brake valve device is associated with a treadle door engine device, an improved manually operable controlling device for said brake valve device and said door engine device, and a current actuated valve device for controlling the operation of the treadle door engine device and which is controlled by a foot operated treadle disposed in front of the exit or treadle door and upon which an outgoing passenger treads when leaving the car.

An object of this invention is to provide control apparatus, such as disclosed in the above noted copending application, with means interlocking the control mechanism for the door engine device with the brake valve device for insuring retention of the brake valve device in brake applied position so long as the treadle door is open and the passenger is standing upon the current controlling treadle device, and for effecting an application of the brakes sufficient to bring the vehicle to rest in the event that the brake valve device has not, previous to the effecting of opening of the treadle door, been moved sufficiently to effect a service application of the brakes.

A further object of the invention is to provide an interlocking device of the character above described, that is adjustable so that any desired degree of brake application may be assured by said device.

A further object of the invention is to provide control mechanism of the above described character, wherein the door or door engine device is so interlocked with the brake switch device and interlocking piston that the brake switch device may not be returned to release position without first effecting closing movement of the door, and so that the door engine device will remain in door open position so long as the treadle in front of the door is depressed as by a passenger treading or standing upon it.

These and other objects of the invention that will be made apparent throughout the further description thereof are attained by means of the apparatus hereinafter described and illustrated in the accompanying drawing.

The figure is a diagrammatic elevational view, partly in section, of the safety car control equipment embodying features of the invention.

Referring to the drawing, the control equipment comprises a brake cylinder 11, a main reservoir 12, a brake valve device 13 for controlling the supply of fluid from the main reservoir to the brake cylinder, a manually operated control device 14, a door engine device 15 for actuating the vehicle door, a magnet valve device 16 for controlling the operation of the door engine device, a pilot switch device 17 for controlling the supply of current to the magnet valve device, a treadle switch device 18 for also controlling the current supplied to the magnet valve device and an interlock piston device 19.

The brake valve device 13 is of the type disclosed in the above mentioned copending application and is provided with an operating lever 21 that is movable from the release position shown in the drawing to full application position indicated by the dotted line, wherein the valve parts of the brake valve device are in application position for supplying fluid from the main reservoir 12 to the brake cylinder 11. A spring 22 that is attached at one end to the lever 21 and at the other end to a clip 23 supported upon the casing 24, serves to normally yieldingly retain the brake valve device in release position against an adjustable stop screw 25 mounted on the casing 24.

The manually operated controlling device 14 comprises a casing 26 having a chamber 27 that is open to the atmosphere through a passage 28 and which contains a rotatable shaft 29 that extends exteriorly of the casing and which is provided with a hand operating handle 31 by means of which the shaft 29 may be rotatively oscillated. The shaft is provided with two cam members 32 and 33, the former serving to actuate a lever 34 that is pivotally mounted within the chamber 27 upon a pin 35, the lever 34 being adapted to engage and operate a pin 36 slidably mounted for vertical movement in the casing 26. The ends of the pin 36 extend from the casing and the upper end is provided with a button 37 that is adapted to be engaged by a foot operated lever 38 that is pivotally connected to the casing 26 by means of a pin 39. The lower end of the pin 36 engages an arm 41 of a bell-crank lever 42 that is pivotally connected to the floor 43 of the vehicle by means of a pin 44. The free end of the bell-crank lever 42 is pivotally connected to the operating lever 21 of the brake valve device by means of an adjustable rod 45. When the pin 36 is depressed either by downward movement of the foot operated pedal 38 or by rotary movement of the shaft 29 through the medium of the cam 32 and the lever 34, the operating arm 21 of the brake valve device is turned in a clockwise direction toward application position.

Casing 26 of the manually operated controlling device 14 also has a chamber 46 containing a valve 47 that is yieldingly held seated upon a valve seat 48 by means of a spring 49. The valve 47 is provided with a fluted stem 51 which extends into a chamber 52, intermediate the chambers 27 and 46, which is connected to a passage and pipe 53 leading to a fluid pressure actuated switch device 17, to be hereinafter described.

Within the chamber 27 is a valve 54 that is adapted to be moved into seating position upon a seat 55 by means of the cam 33 that engages a stem 56 on the valve 54. The valve 54 is provided with a fluted stem 57 which extends through a bore 58 into the chamber 52 and engages the end of the stem 51, so that when the valve 54 is seated by reason of movement of the cam 33 engaging the stem 56, the valve 47 is unseated against the action of the spring 49, so that fluid under pressure may flow from the main reservoir 12 to the chamber 59 of the switch device 17, in a manner to be hereinafter described.

The pilot switch device 17 comprises a casing 58 having a chamber 59 containing a valve piston 61 that is normally yieldingly retained in upper or switch open position by means of a spring 62. The piston 61 is provided with a stem 63 carrying a bridging contact member 64 that is electrically insulated from the stem 63 by means of insulating material 65. The bridging switch member 64 is adapted when in lower switch closed position to engage contacts 66 and conductively connect the conductors 67 and 68 of the electrical interlock control circuit, the former conductor being connected to the trolley wire or conductor 69 by means of the usual power take-off wheel 71.

The treadle door engine device 15 for operating the car door 69 comprises a casing 71 having oppositely disposed piston chambers 72 and 73 containing pistons 74 and 75, respectively, and a central chamber 76 containing a gear segment 77 fixed to a rotatable shaft 78, which is connected to the door mechanism by means of a rod 50. The pistons 74 and 75 are connected by rod 80 constituting a gear rack having teeth which mesh with those of the gear segment 77 and which rotates the gear segment as the pistons move to their operative positions, the pistons being in the closed door position as shown in the figure. Also within the casing 71 is a piston chamber 79 containing a piston 81 and a valve chamber 82 containing a slide valve 83 that is adapted to be operated by a piston stem 84 connected to the piston 81. The piston 81 is biased toward the left position by a spring 85 disposed between the piston and the closure 86. The valve chamber 82 is normally open to the main reservoir 12 through pipe and passage 87 and pipe 40, and the fluid under pressure within the valve chamber 82 normally holds the piston 81 in its right position against the action of the spring 85, in which position the cavity 88 in the slide valve 83 connects the passage 89 in the casing 71 to atmospheric passage 91. Passage 89 opens into the piston chamber 73 and with the piston 81 in door closed position shown, fluid is vented from the piston chamber 83 to the atmosphere.

When fluid under pressure is supplied from the main reservoir 12 to the piston chamber 79 through the operation of a magnet valve device 16 to be hereinafter described, the piston 81 is moved to the left position, wherein the passage 90 is connected through the cavity 88 of the slide valve 83 to the atmospheric passage 91.

With the valve 83 in the left position or door open position, fluid under pressure flows from the valve chamber 82 to the piston chamber 73 through passage 89 and the fluid under pressure acting on the face of the piston 75 forces the piston to the left or door open position, so that the gear segment 77 is rotated in a clockwise direction and causes opening movement of the door rod 50, to the position shown in dotted lines in the drawing.

The magnet valve device 16 comprises a casing 92 having valve chambers 93 and 94 containing valves 95 and 96 respectively, and in electro-magnet winding 97 for operating a core member 98 which constitutes a stem for the valve 96. The valve 96 is provided with a fluted stem 99 that is guided in a bore 101 which opens into a central chamber 102 which is open to passage and pipe 100. The valve chamber 94 is open to the atmosphere through an atmospheric passage 103. The valve 95 is provided with a fluted stem 104 which is guided in a bore 105 in the casing 92 which communicates with the central chamber 102. A spring 106 contained in the valve chamber 93 engages the end of the valve 95 and normally retains it in seated position as shown, when the magnet winding 97 is deenergized. Fluid under pressure is supplied to the valve chamber 93 from the main reservoir through pipe 40 and pipe and passage 87.

The treadle switch device 18 comprises a bridging switch member 111 which serves to electrically connect conductors 68 and 112, the latter being connected to a terminal of the winding 97 of the electro-magnet valve device. The other terminal of the winding 97 is connected to ground or to the car frame. The pilot switch device 17 and switch device 18 are connected in series, so that when both the switch members 64 and 111 thereof are in engagement with their respective contacts 66 and 113, current flows from the power conductor 69 to the ground through the magnet winding 97 of the electrical magnet device and causes the valve 96 to be seated and the valve 95 to be unseated.

The interlocking piston device 19 comprises a casing 114 having a piston chamber 115 containing a piston 116 having a stem 117 provided with a bore 118 in which a rod 119 is mounted for limited universal movement. The rod 119 is threaded for receiving a threaded clevis 121, which is pivotally connected to the operating lever 21 by means of a pin 122. A locking nut 123 is threaded upon the rod 119 for locking the clevis 121 in adjusted position on the rod 119, so that the length thereof may be varied in order to vary the length of the stroke of the piston 116. The piston 116 is normally biased toward its left position shown in the figure, by the spring 22 through the medium of the operating lever 21 and the rod 119. The piston chamber 115 is connected to the pipe 100 so that it may be supplied with fluid under pressure from the main reservoir 12 when the valve 95 is open and in a manner to be hereinafter described. When fluid under pressure is supplied to the piston chamber 115, the fluid acting upon the left face of the piston 116 forces it to the right and moves the operating lever 21 in a clockwise direction to effect movement of the brake valve device to an application position, which position is determined by the length of the rod 119 and the associated clevis 121 and the distance between the shoulder 120 on the piston 116 and the threaded bushing 130 that is threaded into the casing 114.

In operation, assuming the parts of the apparatus to be in release position, wherein the brakes are released and the vehicle door is in closed position, and that the vehicle is running and it is desired to effect an application of the brakes, the operator depresses the foot pedal 38 and thereupon depresses the operating pin 36 and turns the bell-crank lever 42 in a counter-clockwise direction for effecting movement of the operating lever 21 of the brake valve device 13 to application position. The brake valve device is of the self-lapping type, such as disclosed in the above noted copending application, and the degree of brake application effected is substantially proportional to the degree of movement of the operating lever 21 toward full application position. The specific construction of the self-lapping device forms no part of the invention and the details of construction thereof are not herein specified, but it will here be understood that when the operating lever 21 is moved into engagement with the stop lug 124, fluid at main reservoir pressure is supplied to the brake cylinder and that when the operating lever 21 is at points intermediate the stop screw 25 and the stop lug 124, fluid under pressure at less than main reservoir pressure is supplied to the brake cylinder, the pressure of the fluid actually supplied to the brake cylinder being dependent upon the position of the operating lever 21. When the desired application of the brakes has been effected, the operator retains the foot pedal 38 in the depressed condition so as to retain the vehicle at rest after it has been brought to a stop.

When the car has stopped, the operating handle 31 is rotated so that the cam 33 seats the valve 54 and unseats the valve 47 for effecting closure of the pilot switch device 17. With the valve 54 seated and the valve 47 unseated, the chamber 52 is closed to the atmosphere and fluid under pressure then flows from the main reservoir 12 to the piston chamber 59 of the pilot switch device 17 through pipe 40, chamber 46, past the open valve 47, chamber 52, and passage and pipe 53. The fluid under pressure acting on the upper face of the piston 61 forces it downwardly, thereby moving the bridging switch member 64 into engagement with the contact member 66. Closing of the pilot switch 17, however, does not effect energization of the electro-magnet valve device because the treadle switch device 18 is open. When a passenger intending to leave the vehicle treads or stands upon the treadle device 18, the bridging switch member 111 is depressed and moved into engagement with the contact 113, thereupon closing the circuit through the magnet winding 97 from the feed conductor 69 to the ground through take-off wheel 70, conductor 67, contact 66, bridging switch member 64, contact 65, conductor 68, contact 113, bridging switch member 111, contact 113, conductor 112, magnet winding 97 and ground connection 125.

Energization of the magnet winding 97 of the electro-magnet valve device 16 seats the valve 96 and unseats the valve 95 against the action of the spring 106. With the valve 96 seated and the valve 95 unseated, fluid under pressure flows from the main reservoir 12 to the piston chamber 79 of the door engine device 15 through pipe 40, pipe 87, chamber 93, past the open valve 95, chamber 102, and passage and pipe 100. Fluid under pressure at main reservoir pressure plus the tension of spring 85 acting on the right face of the piston 81 overcomes the fluid under pressure at main reservoir pressure acting on the left face of the piston and forces the piston to the left, carrying with it the slide valve 83, so that passage 89 is uncovered by the slide valve and the passage 90 is connected to the atmospheric passage 91 through the cavity 88 in the slide valve 83. The chamber 72 is thus opened to the atmosphere through passage 90, cavity 88, and the atmospheric port 91, and the higher fluid pressure acting on the right face of the piston 75 forces the piston 75 and rack rod 80 to the left causing the gear segment 77 to be rotated in a counter-clockwise direction, so that the door 60 is moved to the open position shown in dotted lines in the figure. The door 60 carries a bridging switch member 126 which engages contacts 127 when the door is in the open position, thus establishing a circuit through conductors 128 and 129, which shunts the pilot switch 17 so that the circuit through the electro-magnet winding 97 will be maintained even though the bridging switch 64 is returned to open position as the door controlling handle 31 is moved to release or door open position. This construction provides for maintaining fluid pressure on the piston 75 tending to hold the door open, even though the door controlling handle 31 is moved to door closed position, and so long as a passenger is standing upon the treadle switch device 18, thus insuring that the door cannot be closed so long as a passenger is standing upon the treadle switch device.

With the valve 96 seated and the valve 95 unseated, fluid under pressure also flows from the main reservoir 12 and from the pipe 100, in the manner described, to the piston chamber 115 of the interlocking piston device 19, whereupon the piston 116 is moved to the right until the stop shoulder 120 engages the bushing 130, and in the event that the operating lever 21 had not been moved to effect a service application of the brakes sufficient to retain the vehicle at rest, for example upon a grade, the piston 116 moves into engagement with the rod 119 and forces the operating lever 21 in a clockwise direction sufficient to effect the desirable brake cylinder pressure for retaining the vehicle at rest. So long as fluid under pressure is supplied to the left face of the piston 116, the brake valve device is held in the position to which it has been moved by the piston 116 against the tension of the spring 22, which is insufficient to overcome the pressure of the fluid acting on the piston 116. Release of the operator's foot from the pedal 38 or movement of the door closing valve handle 31 to release position cannot, therefore, effect release of the brakes until the pressure on the face of the piston 116 has been released sufficiently to permit the spring 22 to return the operating lever 21 of the brake valve device to release position.

When the outgoing passenger steps off the treadle switch device 18, the spring 131 forces the bridging switch member 111 to its upper and open position, thereby interrupting the circuit through the electro-magnet winding 97 and permitting the spring 106 to force the valve 95 to its seated position and to unseat the valve 96.

With the valve 95 seated and the valve 96 unseated, fluid under pressure within the piston chamber 79 of the door engine device 15 and piston chamber 115 of the interlocking piston device 19 is vented to atmosphere, through passage and pipe 100, chamber 102, past the open valve 96, chamber 94, and atmospheric passage 103. With the fluid under pressure in the valve chamber 79 reduced, the fluid under pressure within the valve chamber 82 and acting on the left face of the piston 81, moves the piston and slide valve 83 to the right against the action of the spring 85, so that the passage 90 is uncovered by the slide valve and the passage 89 is connected to the atmosphere through the cavity 88 in the slide valve 83 and the atmospheric passage 91. With the slide valve in the door closed position shown, the higher fluid pressure acting on the left face of the piston 74 moves the rod 80 to the right or to door closed position, thus turning the gear segment 77 in a counter-clockwise direction so as to effect closing movement of the door mechanism.

With the pressure of the fluid in the piston chamber 115 of the interlocking piston device 19 reduced in the manner described, and in the event that the operator has removed his foot from the foot pedal 38 and has moved the operating handle 31 to the door closed position, the spring 22 forces the piston 116 to the left position shown, through the medium of the operating lever 21 and the rod 119.

As a further precaution against the opening of the door without first effecting an application of the brakes, the operating shaft 29 is provided with a cam 32, which, when the shaft is turned to effect operation of the valves 54 and 48 for closing the circuit across the contact 66, turns the lever 34 in a counter-clockwise direction and thus effects movement of the operating lever 21 of the brake valve device to application position through the medium of the pin 36 and the valve lever 42.

In the event that the operator has not removed his foot from the foot pedal 38 during the operation of opening and closing the door of the vehicle in the manner above described through operation of the handle 31, the brakes will be applied until the operator's foot is removed from the pedal and the pin 36 is permitted to rise to the release position shown. The spring 22 may then return the operating lever 21 of the brake valve device to release position. The equipment is then in the condition for a subsequent application of the brakes and opening and closing operation of the doors.

It is apparent from the foregoing, that an effective interlocking means is provided for preventing release of the brakes while the vehicle door is open and while a passenger is standing upon the treadle switch in front of the door and that the interlocking means assures an application of the brakes with sufficient force to hold the car at rest on a grade in the event that the operator has not applied the brakes with sufficient force through the medium of the foot pedal when bringing the vehicle to rest to properly retain it at rest. It is also apparent that proper sequence of operation is assured by means of the apparatus above disclosed.

In addition to that disclosed in the above-mentioned copending application Serial No. 698,242, other safety car equipments, similar to that described herein are disclosed and claimed in the copending application Serial No. 698,243 of David W. Lloyd, filed November 16, 1933 and in my copending application Serial No. 19,378, filed May 2, 1935, both applications being assigned to the assignee of this application.

While but one embodiment of the invention is herein disclosed it is obvious that omissions, additions and other changes may be made in the construction of the control equipment without departing from the spirit of the invention.

Having now described my invention, what I claim as new and desire to secure by Letters Patent, is:

1. In a fluid pressure brake system, the combination with a brake valve device operable to effect an application of the brakes, manually operated means for operating said brake valve device, and a door engine device for opening and closing a door and controlled by said manually operated means, of fluid pressure actuated means also controlled by said manually operated means for also effecting operation of said brake valve device for effecting an application of the brakes.

2. In a fluid pressure brake system, the combination with a brake valve device operable to effect an application of the brakes, manually operated means for operating said brake valve device, and a door engine device for opening and closing a door and controlled by said manually operated means, of fluid pressure actuated means also controlled by said manually operated means for also effecting operation of said brake valve device for effecting an application of the brakes and for preventing release movement of said brake valve device so long as the door engine device is in door-open position.

3. In a fluid pressure brake system, the combination with a brake valve device operable to effect an application of the brakes, manually operable means for operating said brake valve device, a fluid pressure actuated door engine device, and manually operable means for controlling said door engine device, of power driven means controlled by the last said manually operable means for also actuating said brake valve device.

4. In a fluid pressure brake system, the combination with a brake valve device operable to effect an application of the brakes, manually operable means for operating said brake valve device, a fluid pressure actuated door engine device, and manually operable means for controlling said door engine device, of power driven means for also actuating said brake valve device controlled by the last said manually operable means and the said door engine device and cooperating with said brake valve device to prevent release movement thereof so long as the door engine device is in door-open position.

5. In a fluid pressure brake system, the combination with a brake valve device operable to effect an application of the brakes, manually operable means for operating said brake valve device, a fluid pressure actuated door engine device, a current responsive valve device for controlling movement of said door engine device, and manually operable switch means for controlling said current responsive valve device, of power driven means controlled by said current responsive valve device for also actuating said brake valve device.

6. In a fluid pressure brake system, the combination with a brake valve device operable to effect an application of the brakes, manually operable means for operating said brake valve device, a fluid pressure actuated door engine device, a current responsive valve device for controlling movement of said door engine device, and manually operable switch means for controlling said current responsive valve device, of power driven means controlled by said current responsive valve device for also actuating said brake valve device and for preventing release movement of said brake valve device so long as said current responsive valve device is in door-open position.

7. In a fluid pressure brake system, the combination with a brake valve device operable to effect an application of the brakes, manually operable means for operating said brake valve device, and a fluid pressure actuated door engine device, of a current responsive valve device for controlling movement of said door engine device, a manually operable switch device for controlling said current responsive valve device, a power driven means controlled by said current responsive valve device for also actuating said brake valve device, and a switch operable by said door engine device for also controlling said current responsive valve device.

8. In a door and brake controlling apparatus, the combination with a brake valve device operable to effect an application of the brakes, a door engine for controlling a car door, and fluid pressure operated means for controlling said door engine, of a movable abutment for effecting the operation of said brake valve device to apply the brakes, said abutment being operated by fluid under pressure supplied to said fluid pressure operated means.

9. In a fluid pressure brake, the combination with a brake valve device operable to effect an application of the brakes, manually operated means for operating said brake valve device, and a door engine device, of fluid pressure responsive means for also operating said brake valve device to effect an application of the brakes, and current-responsive means controlled by said manually operated means for controlling said door engine device and said fluid pressure responsive means.

10. In a fluid pressure brake, the combination with a brake valve device operable to effect an application of the brakes, manually operated means for operating said brake valve device, and a door engine device, of fluid pressure responsive means for also operating said brake valve device to effect an application of the brakes, and current-responsive means controlled by said manually operated means for simultaneously controlling said door engine device and said fluid pressure responsive means.

11. In a fluid pressure brake, the combination with a brake valve device operable to effect an application of the brakes, and a door engine device, of manually operable means for operating said brake valve device, means mechanically connecting said manually operable means to said brake valve device for transmitting movement of the manually operable means to said brake valve device for operating it to application position, fluid pressure responsive means for also moving said brake valve device to application position, and current-responsive means controlled by said manually operated means for controlling said door engine and said fluid pressure responsive means.

12. In a fluid pressure brake, in combination, a brake controlling valve device operable to effect application and release of the brakes, means automatically actuable from the normal position thereof to effect operation of said valve device to effect an application of the brakes, a door engine device, and manually operable means for controlling said door engine device and said automatically actuable means.

13. In a fluid pressure brake, in combination, a brake controlling valve device operable to effect application and release of the brakes, means automatically actuable from the normal position thereof to effect operation of said valve device to effect an application of the brakes, a door engine device, manually operable means, and means controlled by said manually operable means for controlling said door engine device and said automatically actuable means.

14. In a fluid pressure brake, in combination, a brake controlling valve device operable to effect application and release of the brakes, means automatically actuable from the normal position thereof to effect operation of said valve device to effect an application of the brakes, a door engine device, manually operable means, and means controlled by said manually operable means for simultaneously effecting operation of said door engine device and actuation of said automatically actuable means.

15. In a fluid pressure brake, in combination, a brake controlling valve device operable to effect application and release of the brakes, means automatically actuable to effect operation of said valve device to effect an application of the brakes, a door engine device, and manually operable means adapted to operate said valve device and to control the operation of said door engine device and said automatically actuable means.

16. In a fluid pressure brake, in combination, a brake controlling valve device manually operable to effect application and release of the brakes, a fluid pressure actuated door engine device operated to door-open position upon fluid under pressure being supplied thereto, manually operated means adapted to control the supply of fluid under pressure to said door engine device, and means operated by fluid under pressure supplied to said door engine device, adapted to cause automatic operation of said valve device to effect an application of the brakes.

17. In a fluid pressure brake, in combination, a brake controlling valve device operable to effect application and release of the brakes, means automatically actuable to operate said valve device to effect an application of the brakes, a door engine device, manually operable means for effecting operation of said valve device only, and manually operable means for effecting operation of said valve device and said door engine device, and also actuation of said automatically actuable means.

18. In a fluid pressure brake, in combination, a brake controlling valve device operable to effect application and release of the brakes, manually operated means for operating said valve device, a fluid pressure actuated door engine device operated to door-open position upon fluid under pressure being supplied thereto, said manually operated means being adapted to control the supply of fluid under pressure to said door engine device, and means for preventing operation of said valve device, by said manually operated means, to effect release of the brakes as long as said door engine device is in door-open position, said last means including fluid pressure actuated means operated by fluid under pressure supplied to said door engine device for holding said valve device in brake application position, and means controlled by said door engine device effective to cause the supply of fluid under pressure to said door engine device and to said fluid pressure actuated means to be maintained even though the said manually operated means is operated to brake release position.

19. In a fluid pressure brake, in combination, a brake controlling valve device operable to effect application and release of the brakes, manually operated means for operating said brake valve device, a fluid pressure actuated door engine device operated to door-open position upon fluid under pressure being supplied thereto, a current-responsive device adapted to be energized to cause fluid under pressure to be supplied to said door engine device, when said manually operated means is operated to cause said brake valve device to effect an application of the brakes, and means for preventing release of the brakes by operation of said manually operated means, said means including means operated by fluid under pressure supplied to said door engine device for holding said brake valve device in brake application position, and means controlled by said door engine device for maintaining said current-responsive device energized notwithstanding the operation of the manually operated means to brake release position.

20. In a fluid pressure brake for a vehicle, in combination, a brake controlling valve device operative manually to effect application and release of the brakes, a door engine device operative upon fluid under pressure being supplied thereto to cause opening of a vehicle door and upon fluid under pressure being released therefrom to cause closing of the door, and means cooperating with said valve device and subject to the pressure of the fluid supplied to operate the door engine device to cause opening of the door, for preventing the operation of the said valve device to effect release of the brakes.

21. In a fluid pressure brake for a vehicle, in combination, a brake controlling valve device operative manually to effect application and release of the brakes, a door engine device operative upon fluid under pressure being supplied thereto to cause opening of a vehicle door and upon fluid under pressure being released therefrom to cause closing of the door, valve means for controlling the supply of fluid under pressure to and the release of fluid under pressure from the door engine device, and a movable abutment subject to the pressure of the fluid supplied to the door engine device for preventing operation of the valve device to release the brakes as long as the said valve means is conditioned to cause fluid under pressure to be supplied to the door engine device.

22. In a fluid pressure brake for a vehicle, in combination, a brake cylinder, a self-lapping valve device having an operating element normally in a brake release position, said valve device being operative to cause fluid under pressure to be supplied to and released from the brake cylinder to effect application and release of the brakes, the degree of the brake cylinder pressure being in accordance with the degree of displacement of the operating element out of the normal brake release position, manually operative means for moving the operating element, a door engine device operative upon fluid under pressure being supplied thereto to cause opening of a vehicle door and operative upon the release of fluid under pressure therefrom to cause closing of the door, a movable abutment connected to and movable with the said operating element, said abutment being subject to the pressure of the fluid supplied to the door engine device and effective to prevent reurn of the operating element toward its normal brake release position as long as the supply of fluid under pressure to the door engine device is maintained.

ELLIS E. HEWITT.